(12) United States Patent
Valkama et al.

(10) Patent No.: US 10,023,936 B2
(45) Date of Patent: Jul. 17, 2018

(54) METHOD OF RECOVERING COPPER AND PRECIOUS METALS

(71) Applicant: OUTOTEC (FINLAND) OY, Espoo (FI)

(72) Inventors: Kari Valkama, Pori (FI); Pia Sinisalo, Pori (FI); Janne Karonen, Kokemäki (FI); Kari Hietala, Espoo (FI)

(73) Assignee: OUTOTEC (FINLAND) OY, Espoo (FI)

( * ) Notice: Subject to any disclaimer, the term of this patent is extended or adjusted under 35 U.S.C. 154(b) by 290 days.

(21) Appl. No.: 14/895,740

(22) PCT Filed: Jun. 6, 2014

(86) PCT No.: PCT/FI2014/050461
§ 371 (c)(1),
(2) Date: Dec. 3, 2015

(87) PCT Pub. No.: WO2014/195586
PCT Pub. Date: Dec. 11, 2014

(65) Prior Publication Data
US 2016/0115568 A1    Apr. 28, 2016

(30) Foreign Application Priority Data

Jun. 7, 2013   (FI) .................... 20135630

(51) Int. Cl.
*C22B 3/08*   (2006.01)
*C22B 3/24*   (2006.01)
(Continued)

(52) U.S. Cl.
CPC ........... *C22B 15/0071* (2013.01); *C01G 3/02* (2013.01); *C01G 3/05* (2013.01); *C01G 3/06* (2013.01);
(Continued)

(58) Field of Classification Search
CPC .... C22B 3/08; C22B 3/24; C22B 3/44; C22B 15/0071; C22B 15/0089; C25C 1/12;
(Continued)

(56) References Cited

U.S. PATENT DOCUMENTS 3,637,372 A  *  1/1972  Mayor .................. C22B 3/10
                                                              423/38
8,070,851 B2    12/2011  Muller et al.
(Continued)

FOREIGN PATENT DOCUMENTS

CN      1174576 A       2/1998
FR      2261341 A2  *  9/1975 ............... C22B 3/08
(Continued)

OTHER PUBLICATIONS

FR 2261341 A2. Machine translation of the description and the claims. (Year: 1975).*
(Continued)

*Primary Examiner* — George Wyszomierski
*Assistant Examiner* — Tima M McGuthry Banks
(74) *Attorney, Agent, or Firm* — Buchanan, Ingersoll & Rooney PC

(57) ABSTRACT

Provided is a method of recovering copper and one or more precious metals comprising leaching copper-bearing ore and/or concentrate under atmospheric or slightly pressurized conditions at a temperature below the boiling point of the leach solution in a sulfuric acidic solution in the presence of one or more alkali metal or alkali earth metal halides, whereby the total halide concentration is from 30 to 115 g/L, to dissolve copper and to obtain a leaching liquor comprising copper, sulfur species, and halides in solution. The leaching liquor is then subjected to a solid-liquid separation after which a first aqueous pregnant leach solution and a copper depleted leaching residue are obtained. Copper is
(Continued)

purified by solvent extraction from the first aqueous pregnant leach solution to obtain a first copper-containing loaded organic solution and a first aqueous raffinate. The copper containing loaded organic solution is stripped and copper is recovered.

19 Claims, 1 Drawing Sheet

(51) Int. Cl.
| | |
|---|---|
| C22B 3/44 | (2006.01) |
| C01G 3/02 | (2006.01) |
| C01G 3/05 | (2006.01) |
| C01G 3/06 | (2006.01) |
| C25C 1/12 | (2006.01) |
| C25C 1/10 | (2006.01) |
| C22B 15/00 | (2006.01) |
| C22B 3/26 | (2006.01) |
| C22B 3/00 | (2006.01) |
| C22B 3/22 | (2006.01) |
| C22B 3/46 | (2006.01) |
| C25C 1/20 | (2006.01) |

(52) U.S. Cl.
CPC .............. *C22B 3/0005* (2013.01); *C22B 3/08* (2013.01); *C22B 3/22* (2013.01); *C22B 3/24* (2013.01); *C22B 3/44* (2013.01); *C22B 3/46* (2013.01); *C22B 11/04* (2013.01); *C22B 15/0086* (2013.01); *C22B 15/0089* (2013.01); *C22B 15/0091* (2013.01); *C25C 1/12* (2013.01); *C25C 1/20* (2013.01); *Y02P 10/234* (2015.11); *Y02P 10/236* (2015.11)

(58) Field of Classification Search
CPC .... C25C 1/20; C01G 3/00; C01G 3/02; C01G 3/05; C01G 3/06
See application file for complete search history.

(56) References Cited

U.S. PATENT DOCUMENTS

| | | | |
|---|---|---|---|
| 9,169,533 B2 * | 10/2015 | Morgan | ................ C22B 3/0005 |
| 2004/0130076 A1 | 7/2004 | Marsden et al. | |
| 2009/0173188 A1 | 7/2009 | Muller et al. | |
| 2010/0031779 A1 * | 2/2010 | Abe | ...................... C22B 3/0017 75/740 |
| 2012/0279357 A1 * | 11/2012 | Dixon | ...................... C22B 3/24 75/743 |

FOREIGN PATENT DOCUMENTS

| | | | |
|---|---|---|---|
| WO | 2004/035840 A1 | 4/2004 | |
| WO | WO-2007134344 A | * 11/2007 | |
| WO | WO-2013030450 A1 | * 3/2013 | ......... C22B 15/0067 |

OTHER PUBLICATIONS

CN 1174576. Machine translation. (Year: 1998).*
Office Action issued by the Chinese Patent Office in corresponding Chinese Patent Application No. 201480036875.5 dated Jul. 15, 2016 (16 pages including English translation).
International Search Report (PCT/ISA/210) dated Oct. 30, 2014, by the Finnish Patent Office as the International Searching Authority for International Application No. PCT/FI2014/050461.
International Preliminary Report on Patentability (PCT/IPEA/409) dated May 28, 2015, by the Finnish Patent Office as the International Searching Authority for International Application No. PCT/FI2014/050461.
Padilla et al., "Leaching of enargite in H2S04—NaCl—O2 media", vol. 80, No. 4, Dec. 30, 2005, pp. 272-279.

* cited by examiner

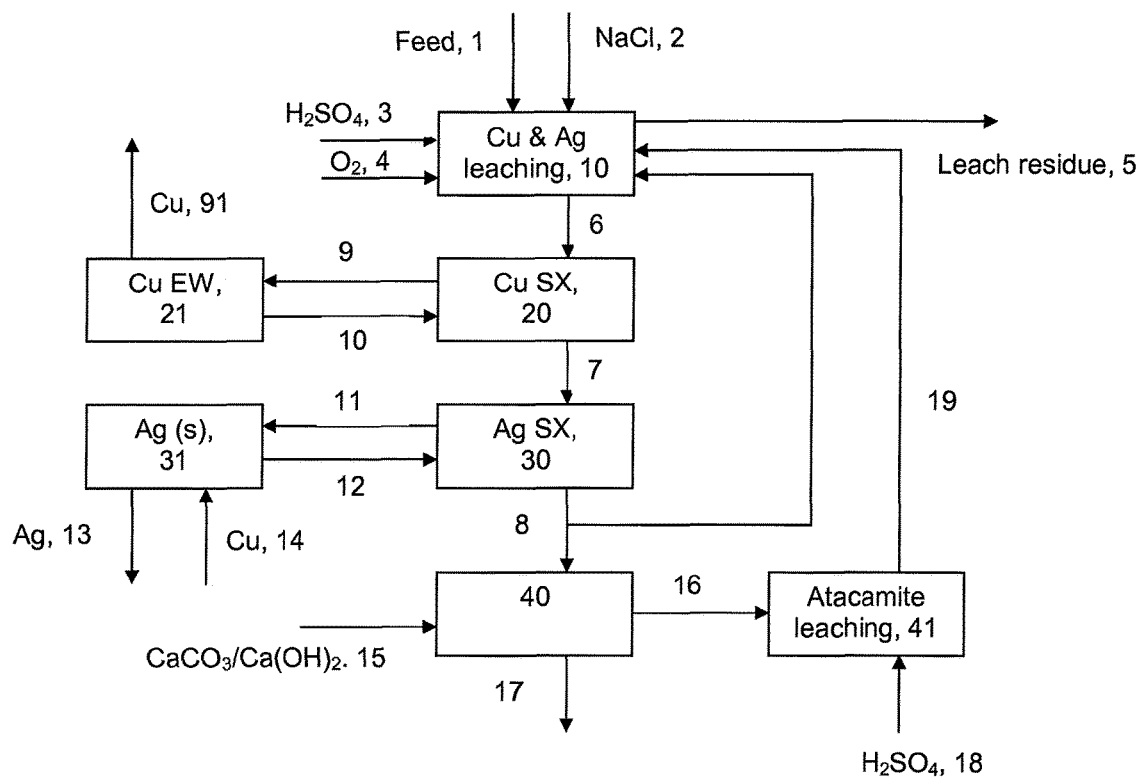

METHOD OF RECOVERING COPPER AND PRECIOUS METALS

FIELD OF THE INVENTION

The present invention relates to a method of recovering metals from ores and/or concentrates, and particularly to recovery of copper and optionally one or more precious metals from copper-bearing sulfide raw materials.

BACKGROUND OF THE INVENTION

Recovery of copper from oxidic copper bearing raw materials can be realized by leaching the raw materials with sulfuric acid at pH 1 to 2.5 followed by copper recovery by electrowinning after solvent extraction. However, especially with primary sulfide minerals, copper can be leached with sulfuric acid only at high temperatures and pressures resulting in a pregnant leach solution containing high sulfuric acid concentration due to high level of oxidation of elemental sulfur. This makes solvent extraction of copper expensive as excessive amount of acid in the solution has to be neutralized prior to the solvent extraction stage.

There are several discloses in the literature for the recovery of metals, in particular copper, from a copper-bearing sulfide ores where either hydrochloric acid or high chloride concentration has been utilized. Although leaching can be performed in reduced pressure and temperature as compared to sulfuric acid processes a high chloride concentration in pregnant leach solution decreases copper extraction yield in solvent extraction and makes the process more unattractive.

WO2004035840 for example relates to a method for the recovery of metals, in particular copper, from a copper-bearing raw material, whereby the material is leached into a chloride-containing solution. The leaching of the raw material is performed oxidatively and at a sufficiently high redox potential that the copper in the copper chloride solution from leaching is mainly divalent. The chloride solution obtained, which contains copper and potentially other valuable metals, is fed to liquid-liquid extraction. In the extraction the copper is first transferred to the organic phase with extraction and then to a sulphate solution in stripping, which is fed to copper electrowinning.

US2010/0031779A1 on the other hand discloses a process for recovering copper from an acid aqueous solution containing cupric chlorides and alkali metal and/or alkali earth metal chlorides by a solvent extraction with a cation exchange extractant, comprising the step of processing a solvent extraction in the presence of sulfate ions.

BRIEF DESCRIPTION OF THE INVENTION

An object of the present invention is to provide a method for the recovery of copper and optionally one or more precious metals from copper-bearing sulfide ore and/or concentrate. The objects of the invention are achieved by a method characterized by what is stated in the independent claims. The preferred embodiments of the invention are disclosed in the dependent claims.

The present invention provides a method for the hydrometallurgical recovery of copper and other metals where leaching conditions of the copper-bearing sulfide ore and/or concentrate are optimized in such way that recovery of copper and other precious metals can be attained under atmospheric or slightly elevated pressure (up to 300 kPa) and in mild conditions. In addition recovery of copper by solvent extraction can be accomplished without the necessity of additional neutralization steps. Due to relatively low chloride concentration metals can be recovered in high yield. This will allow direct recovery of copper and simultaneous leaching of copper and silver precious metals.

The present invention relates to a method of recovering copper and one or more precious metals from copper-bearing sulfide ore or concentrate comprising leaching copper-bearing ore and/or concentrate under atmospheric or slightly pressurized conditions at a temperature below the boiling point of the leach solution in a sulfuric acidic solution in the presence of one or more alkali metal or alkali earth metal halides, whereby the total halide concentration is from 30 to 115 g/L, to dissolve copper and to obtain a leaching liquor comprising copper, sulfates and halides in solution. The leaching liquor is then subjected to a solid-liquid separation after which a first aqueous pregnant leach solution and a copper depleted leaching residue are obtained. Copper is purified by solvent extraction from the first aqueous pregnant leach solution to obtain a first copper-containing loaded organic solution and a first aqueous raffinate. The copper containing loaded organic solution is stripped and copper is recovered from a stripping solution that contains trace amounts of chlorides.

BRIEF DESCRIPTION OF THE DRAWINGS

In the following the invention will be described in greater detail by means of preferred embodiments with reference to the attached drawings, in which FIG. 1 shows a copper and silver leaching and recovery process illustrating a first example of the invention.

DETAILED DESCRIPTION OF THE INVENTION

The present invention relates to a hydrometallurgical method of recovering metals from ores and/or concentrates, and particularly to recovery of copper and optionally one or more other precious metals from copper-bearing sulfide raw materials.

The present invention provides a method of recovering copper from copper-bearing sulfide ore and/or concentrate comprising the steps of: (a) leaching copper-bearing ore and/or concentrate under atmospheric or slightly pressurized conditions at a temperature below the boiling point of the leach solution in a sulfuric acidic solution in the presence of one or more alkali metal and/or alkali earth metal halides, whereby the total halide concentration is from 30 to 115 g/L, to dissolve copper and to obtain a leaching liquor comprising copper, sulfur species, and halides in solution; (b) solid-liquid separating the leaching liquor to obtain a first aqueous pregnant leach solution and a copper depleted leaching residue; (c) extracting copper by solvent extraction from the first aqueous pregnant leach solution to obtain a first copper-containing loaded organic solution and a first aqueous raffinate; (d) stripping copper from the first copper containing loaded organic solution with an electrolyte solution to obtain a copper-depleted organic solution and a copper-containing electrolyte solution; (e) and recovering copper from the copper-containing electrolyte solution.

The present invention further provides a method of recovering copper and one or more precious metals from copper-bearing sulfide ore or concentrate further comprising the steps of: (f) extracting silver by solvent extraction from the first aqueous raffinate to obtain a silver-containing loaded organic solution and a second aqueous raffinate; (g) stripping the silver-containing loaded organic solution to obtain a silver-containing aqueous solution; and (h) recovering silver from the silver-containing aqueous solution.

In particular the present invention is suitable for the recovery of copper and optionally one or more precious metals form copper concentrate and/or ore where the main mineral is chalcopyrite ($CuFeS_2$). In addition to copper and precious metals, such as silver and gold, the ore and/or concentrate may comprise further precious or noble metals such as nickel, platinum, and/or palladium. The ore and/or concentrate may also comprise for example iron, arsenic, antimony, and/or calcium.

FIG. 1 shows an example of a process flow of a copper and silver leaching and recovering process. Copper-bearing raw material (1) is fed into a copper and silver leaching stage (10) wherein the raw material (1) is leached under atmospheric or slightly pressurized conditions. Leaching may be performed in particular under total pressure of from 70 to 300 kPa, advantageously under atmospheric pressure. The temperature of the leaching stage is below the boiling point of the acid solution, advantageously from 80 to 105° C., preferably from 90 to 99° C. The temperature of the leaching stage may locally rise above the boiling point of the leach solution due to hydrostatic pressure. The leaching is performed with a sulfuric acid solution (3) in the presence of halides (2). Sulfur exists in the solution mainly as sulfate or bisulfate ions. Their total amount is dependent on the precipitation of iron which may cause the sulfur species to co-precipitate for example as jarosite. Preferably the total concentration of different sulfur species, in particular sulfate and bisulfate ions, given as sulfur is from 2 to 25 g/L. The total halide concentration is from 30 to 115 g/L, preferably from 35 to 110 g/L, more preferably from 40 to 95 g/L. Halides prevent the passivation of chalcopyrite during leaching and enable the solubilization of silver. The desired halide concentration may vary based on the silver content of the feed and is thus suitably adjusted according to the silver content. Excessive amount of halides will not enhance the copper leaching and may furthermore compromise the recovery of copper and silver by solvent extraction. Halides are preferably provided to the leaching stage in the form of one or more alkali metal and/or alkali earth metal halides. The alkali metal is preferably sodium. The halide is preferably chloride so as to prevent dissolution of gold. Advantageously NaCl is used as the halide source. Preferably the leaching solution comprises from 30 to 115 g/L chloride.

The redox potential of the leach is adjusted to the range of 400 to 600, in particular 500 to 600 mV Ag/AgCl vs. Pt using feed of an oxidizing agent (4). The oxidizing agent may be oxygen, oxygen enriched air, or air, preferably oxygen. pH of the leaching stage is preferably kept from 1.7 to 3, more preferably from 1.7 to 2.6, most preferably from 2.0 to 2.4, in order to precipitate iron but to prevent precipitation of copper as copper hydroxychloride, in particular atacamite ($Cu_2Cl(OH)_3$)). Iron may be precipitated as one or more of hematite, jarosite, goethite, and/or other iron precipitate. Impurities such as arsenic or antimony are not leached or they are immediately co-precipitated with iron. A small amount of gold (about 0.1 to 10%) may be leached. If a small amount of gold has dissolved in the leaching step, it can be precipitated back into the leaching residue by means of a suitable reducing agent or recovered by known methods such as the method disclosed in WO2011154603.

The reactions occurring in the copper and silver leaching stage can be described by means of the following reaction equations:

$$CuFeS_2(s)+3CuCl_2(aq) \rightarrow 4CuCl(aq)+FeCl_2(aq)+S^0(s) \quad (i)$$

$$4Cu^+(aq)+O_2(g)+4H^+(aq) \rightarrow 4Cu^{2+}(aq)+2H_2O(aq) \quad (ii)$$

$$4Fe^{2+}(aq)+O_2(g)+6H_2O(aq) \rightarrow 4FeOOH(s)+8H^+(aq) \quad (iii)$$

$$2S^0(s)+3O_2(g)+2H_2O(aq) \rightarrow 4H^+(aq)+2SO_4^{2-}(aq) \quad (iv)$$

After copper and silver leaching stage liquid/solids separation is performed (not shown in the FIG. 1), whereby gold contained in the solids is separated from the solution. Separation may be accomplished by any known liquid/solid separation techniques including filtration and thickening. The copper-depleted leaching residue (5) may then be treated in an appropriate way to recover gold.

With reference to FIG. 1, the pregnant leach solution (PLS, 6) obtained from the solid/liquid separation stage is subjected to a copper solvent extraction (Cu SX) stage (20). Typically the PLS comprises dissolved metals including from 1 to 100 g/L, in particular from 1 to 70 g/L, copper and from 1 to 100 mg/L, in particular from 1 to 80 mg/L, silver. Prior to extraction the PLS is cooled to below 60° C., preferably below 45° C., more preferably to 40° C. Copper is then extracted from the aqueous solution with an organic solution comprising commercial hydroxyoxime based copper extractant diluted in a hydrocarbon solvent. The copper extractant is preferably selected from aldoximes, ketoximes, and any mixtures thereof. The volume ratio of the first aqueous pregnant leach solution and the organic solution is between 1:6 and 6:1.

The extractant may further comprise modifiers. Advantageously the copper extractant is a mixture of 5-nonylsalicylaldoxime or 5-dodecylsalicylaldoxime and 2-hydroxy-5-nonylacetophenone oxime, in particular 5-nonylsalicylaldoxime and 2-hydroxy-5-nonylacetophenone oxime, in v/v ratio of 1:1 (LIX984N). Due to leaching conditions neutralization is not required prior to and/or during extraction. The extraction of copper is preferably done without any neutralization of the aqueous phase prior to and/or during extraction as it would have negative impact on the operational costs of the process. Neutralization, however, would increase copper yield in extraction but it does not compensate the costs as copper in the raffinate is not lost but recycled back to leaching or recovered by other means.

Copper may be extracted in one or several stages. The number of the extraction stages is depended on the copper and chloride concentration of the aqueous phase. The organic solution exiting the extraction stage is taken via scrubbing to stripping. Impurities and co-extracted metals may be removed by scrubbing the copper-containing loaded organic solution with diluted acid solution, in particular sulfuric acid solution containing copper sulfate. When copper is recovered in copper electrolysis, i.e. electrowinning, diluted copper electrolyte solution from the copper electrowinning may be utilized as the diluted sulfuric acid solution containing copper sulfate. The copper-containing loaded organic solution is scrubbed in one or several stages to ensure that no or only trace amounts of halides enter the copper electrowinning stage. Scrubbing solutions may be subjected to recovery of residual copper or returned to extraction stage in copper solvent extraction.

The reaction occurring in the Cu SX stage can be described by means of the following reaction equation:

$$Cu^{2+}(aq)+2RH(org) \rightleftarrows CuR_2(org)+2H^+(aq) \quad (v),$$

wherein R is the copper extractant.

Copper is then stripped from the copper-containing loaded organic solution with an electrolyte solution, in one or several stages. The electrolyte solution comprises high amount of sulphuric acid and the copper is transferred to the aqueous phase. The organic phase may then be recycled back to the copper extraction stage. The electrolyte solution is preferably an aqueous sulfate solution, in particular an acidic copper sulfate solution. The electrolyte solution preferably comprises 150 to 190 g/L sulfuric acid and 30 to 55 g/L, preferably 35 to 45 g/L Cu. Copper may then be recovered from the electrolyte solution by electrowinning (EW, 21) as a copper cathode (91). Alternatively copper may be recovered for example by chemical cementation or crystallization. Prior to recovery of copper the copper-containing electrolyte solution may be subjected to purification by filtering the electrolyte solution though a dual-media filter for removing any remaining organic residues prior to electrolysis.

The reaction occurring in the copper electrowinning (Cu EW) can be described by means of the following reaction equation:

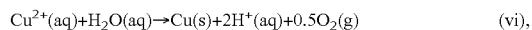

$$Cu^{2+}(aq) + H_2O(aq) \rightarrow Cu(s) + 2H^+(aq) + 0.5O_2(g) \qquad (vi),$$

More than 50%, of the acid (3) required in the copper and silver leaching stage may be regenerated in copper electrowinning and transferred to the leaching stage via the copper extraction raffinate. The rest may be covered by hydrochloric or sulfuric acid make-up, however, sulfuric acid is preferred.

The copper-depleted aqueous raffinate (7) i.e. the first aqueous raffinate obtained from the copper extraction is then subjected to silver solvent extraction (Ag SX, 30). Silver is extracted from the first aqueous raffinate (7) with a water-immiscible organic solution of a tertiary phosphine sulfide, such as triisobutylphosphine sulfide (TIBPS, Cyanex 471x). The silver extractant solution may further comprise organophosphoric acid, organophosphonic acid, organophosphinic acid, and/or carboxylic acid modifier. Advantageously organophosphoric acid, such as di-(2-ethylhexyl)phosphoric acid (D2EHPA), or tertiary carboxylic acid, such as neodecanoic acid (Verastic 10), is utilized as a modifier to increase the solubility of the silver-sulfide complex in the organic phase. Preferably the silver extractant comprises TIBPS and 5 vol % D2EHPA or from 1 to 15 vol % Versatic 10. Due to extraction process conditions pH adjustment or neutralization is not required during extraction. Thus, acid in copper solvent extraction raffinate is not lost and may be reused in leaching.

The reaction occurring in the Ag SX stage (30) can be described by means of the following reaction equation:

$$AgCl(aq) + L(org) \rightarrow L \cdot AgCl(org) \qquad (vii),$$

wherein L is the silver extractant.

Silver may be extracted in one or several steps. The organic solution exiting the extraction stage is taken via scrubbing to stripping. Impurities and co-extracted metals may be removed by scrubbing the silver containing loaded organic phase with an acid solution containing from 0 to 4 M chlorides and from 1 to 4 M sulfuric acid or hydrochloric acid.

Silver may then be stripped with a thiosulfate solution. The thiosulfate solution preferably comprises sodium sulfite to prevent the oxidation of thiosulfate. Silver is stripped in one or several steps and the organic phase may then be recycled back to the silver solvent extraction stage. Silver may be recovered from the stripping solution for example by precipitation or chemical cementation (31), for example cementation with Cu powder (14) and separation by filtration to obtain cemented silver (13). Alternatively silver may be recovered by electrowinning.

Major part of copper- and silver-depleted and acid containing raffinate (8) from the copper and silver solvent extraction stages (20, 30) is recycled back to the copper leaching stage (10). A bleed stream between 1 to 50% from raffinate is subjected to a copper removal stage (40) where copper is preferably precipitated as copper hydroxychloride by adding base, in particular $CaCO_3$ and/or $Ca(OH)_2$ (15) to solution. Atacamite $Cu_2Cl(OH)_3$ is the preferred copper hydroxychloride precipitate. Precipitation of copper hydroxychloride from the first aqueous raffinate and/or the second aqueous raffinate may be performed at pH of 2.6 to 7, preferably 2.6 to 5.5, more preferably 3 to 5.5. After liquid/solids separation the obtained precipitate is then leached (41) with aqueous sulphuric acid solution (18), at temperature of 20 to 60° C. and sulfuric acid concentration of 20 to 150 g/L, and the slurry is recycled back to leaching (10) where the excess acid is used. Alternatively the slurry may be subjected to liquid/solids separation and the obtained liquid is recycled back to leaching (10). The solution from copper removal stage enters impurity precipitation where impurity metals are removed by precipitation with $Ca(OH)_2$.

EXAMPLES

Example 1

Copper and silver leaching: Chalcopyrite concentrate is fed to an atmospheric copper leaching stage at 95° C. Concentrate is leached with sulfuric acid and acidic raffinate from solvent extraction in presence of sodium chloride. Sulfate concentration is about 50 g/L and chloride concentrate is 80 g/L. Oxygen gas is used as an oxidizing agent. pH is kept at 2.2 by adding sulfuric acid. Copper and silver leaching yields with 12 h residence time are about 94% and 95%, respectively.

Copper and silver recovery: Pregnant leach solution has a pH of 2 to 2.4 and it contains 40 g/L copper. It is cooled to 40° C. Copper is extracted with 40 vol % 1:1 volume blend of 5-nonylsalicylaldoxime and 2-hydroxy-5-nonylacetophenone oxime in a high flash point hydrocarbon diluent (LIX984N) in three stages. Raffinate contains 10 g/L Cu and about 55 g/L $H_2SO_4$ and is subjected to silver extraction. Impurities from copper-containing organic phase are scrubbed in one scrubbing stage with diluted electrolyte solution from copper electrowinning. Copper is stripped with electrolyte in two stages. Organic phase is recycled back to copper extraction.

Silver is extracted with 26 g/L triisobutylphosphine sulfide solution (Cyanex 471x) with 5 vol % di-(2-ethylhexyl) phosphoric acid (D2EHPA) modifier. Temperature is 40° C. Silver yield in extraction is 98% in two stages. Most of the acid containing raffinate is recycled back to copper leaching stage. Co-extracted metals are scrubbed with 2 M HCl. Silver is stripped with a 108 g/L sodium thiosulfate solution containing 15 g/L sodium sulfite. Silver is stripped in two stages and the organic phase is recycled back to silver extraction. Silver stripping solution contains 0.5 to 2 g/L silver. Silver is cemented with copper powder. Cemented silver is separated with a filter. Thiosulfate solution is recycled back to stripping.

Most of the raffinate coming from copper and silver solvent extraction goes to copper and silver leaching stage A bleed stream from raffinate is pumped to copper precipitation stage where atacamite, $Cu_2(OH)_3Cl$, is precipitated at pH 3.8 by adding calcium hydroxide. After solid-liquid separation the precipitate is leached with sulfuric acid and then the slurry is returned to copper and silver leaching. Solution from copper precipitation goes to impurity precipitation where impurities are precipitated at pH 10.

Example 2

Copper concentrate containing 29.2 wt % copper mainly as chalcopyrite and 235 g/t silver was leach in a 5 L titanium-lined reactor at atmospheric pressure. The reactor was equipped with 4 baffles. The reactor was filled with a solution that contained 10 g/l copper and 80 g/l chloride. 620 g of concentrate was added to the reactor and the slurry was heated to 95° C. Oxygen feed was 400 mL/min and it was started 1 h after the start of the experiment. Oxygen was fed below the mixer. pH was kept between 2 to 2.3 by adding concentrated sulfuric acid. Acid was added by pumping and the pump was controlled automatically by the measured pH. After 15 hours the leaching residue contained 1.6% copper and 10 g/t silver.

Example 3

Solvent extraction of copper was measured with 40 vol % 2-hydroxy-5-nonylsalicylaldoxime (Acorga M5640) in C11-C14 paraffin and naphthene solution (Shellsol D70 kerosene) which contained 4.3 g/l copper before the test. An aqueous phase contained 41.1 g/L copper, 78.8 g/L chloride and 19 g/L zinc. A shaking test was made in a separatory funnel at room temperature without pH control. Both shaking and settling times were 15 minutes. Organic phase volume in the test was 60 mL and the aqueous phase volume was 30 mL. After extraction aqueous phase contained 19 g/L copper.

Example 4

Copper concentrate leaching and solvent extraction was operated continuously at lab scale and a small part of the solvent extraction aqueous raffinate was collected for copper removal stage test. Copper removal consisted of two 2 L reactors where the residence time was 2.6 h. Temperature in reactors was kept at 40° C. The feed concentrations were at the range of Cu 11.3-12.3 g/L, Zn 10-10.4 g/L, Fe 0.136-0.228 g/L, S 11.1-13.7 g/L, Ca 0.761-0.834 g/L, Cl 85-90 g/L. Calcium hydroxide slurry at solid concentration of 250 g/L was fed to the first reactor to control the pH. The pH measurements and sample analyses from solution and solid phase are shown in Tables 1 and 2, respectively. The results show how copper is precipitated as a chloride precipitate with molar ratio of copper:chloride between 1.82-1.94. Copper also precipitates before the majority of zinc precipitates. The precipitate also contains gypsum as excess of sulfates are precipitated.

TABLE 1

Solution analyses of copper removal test

| pH — | Cu mg/l | Zn mg/l | Fe mg/l | S mg/l | Ca mg/l |
|---|---|---|---|---|---|
| 3.51 | 7700 | 8750 | 6.4 | 1580 | 2920 |
| 3.62 | 1610 | 8390 | 2.1 | 864 | 5080 |
| 4.34 | 169 | 7450 | <1 | 645 | 6400 |
| 4.52 | 229 | 7400 | 0.9 | 724 | 5660 |
| 4.53 | 78 | 7060 | 1.1 | 642 | 6110 |
| 5.01 | 27.4 | 6200 | <1 | 715 | 5530 |
| 5.24 | 25.9 | 6800 | <1 | 593 | 6430 |
| 5.64 | 33 | 6490 | 1.3 | 568 | 6440 |

TABLE 2

Solid analyses of copper removal test

| pH — | Cu % | Cl % | Ca % | Fe % | Zn % | S % |
|---|---|---|---|---|---|---|
| 3.51 | 1.06 | N/A | 22.4 | 0.059 | 0.031 | 18.1 |
| 3.62 | 10.2 | N/A | 18.9 | 0.372 | 0.61 | 13.2 |
| 4.34 | 9.58 | N/A | 18.1 | 0.288 | 1.85 | 13.3 |
| 4.52 | 26.8 | 7.68 | 10.5 | 0.447 | 3.4 | 7.4 |
| 4.53 | 3.92 | N/A | 20.9 | 0.083 | 0.766 | 16.2 |
| 5.01 | 16.2 | 4.8 | 15.6 | 0.482 | 2.61 | 11.5 |
| 5.24 | 16.5 | 4.99 | 14.5 | 0.51 | 3.25 | 11.7 |
| 5.64 | 33.6 | 10.3 | 5.92 | 0.697 | 7.26 | 4.1 |

It will be obvious to a person skilled in the art that, as the technology advances, the inventive concept can be implemented in various ways. The invention and its embodiments are not limited to the examples described above but may vary within the scope of the claims.

The invention claimed is:

1. A method of recovering copper from copper-bearing sulfide ore and/or concentrate comprising the steps of:
   (a) leaching copper-bearing ore and/or concentrate under atmospheric or elevated pressure up to 300 kPa at a temperature below the boiling point of the leach solution in a sulfuric acid solution in the presence of one or more alkali metal or alkali earth metal halides, whereby the total halide concentration is from 30 to 115 g/L, to dissolve copper and to obtain a leaching liquor comprising copper, sulfur species, and halides in solution;
   (b) solid-liquid separating the leaching liquor to obtain a first aqueous pregnant leach solution and a copper depleted leaching residue;
   (c) extracting copper by solvent extraction from the first aqueous pregnant leach solution to obtain a first copper-containing loaded organic solution and a first aqueous raffinate; subjecting a bleed stream of the first aqueous raffinate to a copper hydroxychloride precipitation step; and after solid-liquid separation precipitating impurities from the copper-depleted solution;
   (d) stripping copper from the first copper containing loaded organic solution with an electrolyte solution to obtain a copper-depleted organic solution and a copper-containing electrolyte solution; and
   (e) recovering copper from the copper containing electrolyte solution.

2. The method as claimed in claim 1, wherein copper is recovered from the copper-containing electrolyte solution by electrowinning to obtain to obtain metallic copper and a copper-depleted electrolyte solution.

3. The method as claimed in claim 1, wherein the method comprises recycling a majority of the first aqueous raffinate to the copper leaching step (a).

4. The method as claimed in claim 1, wherein the method further comprises the steps of:

(f) extracting silver by solvent extraction from the first aqueous raffinate to obtain a silver-containing loaded organic solution and a second aqueous raffinate;

(g) stripping the silver-containing loaded organic solution to obtain a silver-containing aqueous solution; and (h) recovering silver from the silver-containing aqueous solution.

5. The method as claimed in claim 4, wherein silver is recovered from silver-containing aqueous solution by precipitation, cementation, or electrowinning.

6. The method as claimed in claim 4, wherein the method comprises recycling a majority of the second aqueous raffinate to the copper leaching step (a).

7. The method as claimed in claim 4, wherein silver is extracted from the first aqueous raffinate with an organic solution of a tertiary phosphine sulfide diluted in a hydrocarbon diluent optionally comprising organophosphoric acid, organophosphonic acid, organophosphinic acid, and/or carboxylic acid modifier.

8. The method as claimed in claim 7, wherein the tertiary phosphine sulfide is triisobutylphosphine sulfide.

9. The method as claimed in claim 7, wherein the modifier is di-(2-ethylhexyl)phosphoric acid (D2EHPA) or tertiary carboxylic acid.

10. The method as claimed in claim 4, wherein the silver-containing loaded organic solution is scrubbed with a diluted acid solution to remove impurities, prior to stripping step (g).

11. The method as claimed in claim 4, wherein the method comprises subjecting a bleed stream of the second aqueous raffinate to a copper hydroxychloride precipitation; and after solid-liquid separation precipitating impurities from the copper-depleted solution.

12. The method as claimed in claim 4, wherein in the precipitation of copper hydroxychloride from the first aqueous raffinate and/or the second aqueous raffinate the pH is 2.6 to 7.

13. The method as claimed in claim 1, wherein copper is extracted from the first aqueous pregnant leach solution by solvent extraction utilizing an organic solution comprising hydroxyoxime based copper extractant diluted in a hydrocarbon solvent as the copper extractant.

14. The method as claimed in claim 13, wherein the hydroxyoxime based copper extractant is selected from aldoximes, ketoximes, and any mixtures thereof.

15. The method as claimed in claim 13, wherein the volume ratio of the first aqueous pregnant leach solution and the organic solution is between 1:6 and 6:1.

16. The method as claimed in claim 1, wherein the first copper-containing loaded organic solution is scrubbed with a diluted acid solution to remove impurities, prior to stripping step (d).

17. The method as claimed in claim 1, wherein leaching of metals in step (a) is conducted in oxidation-reduction potential of 400 to 600 mV Ag/AgCl vs. Pt; and pH from 1.7 to 3.

18. The method as claimed in claim 1, wherein oxygen, oxygen enriched air, or air is used in leaching of metals in step (a); and it is conducted under total pressure of from 87 to 300 kPa.

19. The method as claimed in claim 1, wherein the first aqueous pregnant leach solution contains from 1 to 100 g/L copper.

\* \* \* \* \*